United States Patent
Daraiseh et al.

(10) Patent No.: US 6,370,127 B1
(45) Date of Patent: Apr. 9, 2002

(54) MULTILEVEL DISTRIBUTED FRAME SELECTION AND POWER CONTROL CDMA ARCHITECTURE METHOD AND APPARATUS FOR TELECOMMUNICATION NETWORKS

(75) Inventors: Abdel-Ghani Daraiseh, Richardson, TX (US); Mohamed Landolsi, Nepean (CA); Kalyan Basu, Plano, TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/217,266

(22) Filed: Dec. 21, 1998

(51) Int. Cl.[7] .................................................. H04Q 7/00
(52) U.S. Cl. ........................ 370/328; 370/342; 370/318; 370/401; 455/422; 455/560; 455/522
(58) Field of Search ................................. 370/352, 401, 370/338, 335, 342, 318, 328; 455/422, 436, 522, 69, 560, 445

(56) References Cited

U.S. PATENT DOCUMENTS 5,633,868 A * 5/1997 Baldwin et al. ............ 370/331
5,761,619 A * 6/1998 Danne et al. ............... 455/422
6,167,036 A * 12/2000 Beven ........................ 370/331
6,178,337 B1 * 1/2001 Spartz et al. ............... 455/561
6,208,627 B1 * 3/2001 Menon et al. .............. 370/328

* cited by examiner

Primary Examiner—Huy D. Vu
Assistant Examiner—Tri H. Phan
(74) Attorney, Agent, or Firm—Haynes and Boone, LLP

(57) ABSTRACT

A mobile communications system having a multi-level distributed frame selection and power control architecture includes a plurality of base station transceiver subsystems (BTSs) arranged in cells. Each base station transceiver subsystem (BTS) includes a capability for establishing a radio frequency interface with a subscriber unit in conjunction with a telephone call. A PSEL provides for implementing a power control and frame selection of compressed packet data in conjunction with the telephone call, the PSEL coupled to and being positioned proximate the plurality of base station transceiver subsystems. A router is coupled to the PSEL for routing compressed packet data to and from the PSEL. Lastly, a CSEL provides for implementing call processing and call management in conjunction with the telephone call, the CSEL coupled between the router and a prescribed mobile switching center (MSC) and further being positioned proximate the MSC, wherein the router is further for routing compressed packet data to and from the CSEL.

26 Claims, 3 Drawing Sheets

US 6,370,127 B1

MULTILEVEL DISTRIBUTED FRAME SELECTION AND POWER CONTROL CDMA ARCHITECTURE METHOD AND APPARATUS FOR TELECOMMUNICATION NETWORKS

BACKGROUND OF THE INVENTION

1. Field of the Invention

The present invention relates generally to telecommunication networks, and more particularly, to a frame selection and power control CDMA architecture for telecommunication networks.

2. Discussion of the Related Art

In cellular telephone systems, a service area is divided into cells, each of which may be further divided into sectors. Each cell is serviced by a single base station (BS) and all of the base stations are connected to a mobile switching center (MSC) (also referred to as a Mobile Telephone eXchange (MTX)) via a base station controller (BSC) and hardware links (e.g., T1, E1, optical fiber, or satellite links). A plurality of mobile units (i.e., subscriber units) can be connected to the MSC by establishing radio links with one or more nearby base stations.

FIG. 1 illustrates an exemplary MSC and Code Division Multiple Access (CDMA) system architecture 10. The MSC 12 is coupled to a Public Switched Telephone Network 14 (PSTN) or other public network. The CDMA system 10 includes a plurality of base station transceiver subsystems (BTSs) 16, each of which define respective cells 18. Each cell can have a coverage area radius on the order of approximately 1–6 miles, typical. Various components of mobile telephone systems are known in the art and thus only those components of mobile communications which are pertinent with respect to the present disclosure are disclosed and briefly described herein.

The system architecture of FIG. 1 further includes a base station controller (BSC) 20 having a router 22 (also referred to as a CDMA Interconnect System (CIS)) and a selector 24 (SEL). The CDMA router 22 provides a packet routing function and allows the MSC-CDMA system 10 to be fully connected, i.e., any component can communicate with any other component in the system. The router 22 thus routes packets and provides any necessary communication between, for example, any base station transceiver subsystem (BTS) 16, the selector (SEL) 24, or the MSC 12. The router is also capable of performing the broadcast of packets.

The selector (SEL) 24 handles an appropriate data formatting of voice data on the MSC-side and on the BTS-side of the selector. The SEL includes a selector subsystem including vocoder (voice coder/decoder) digital signal processors (DSPs) and call processing managements functions. The SEL 24 further receives control information from the MSC 12 via the router 22. In particular, the selector (SEL) provides the functions of voice coding, multiplexing, handoff, power control, and radio link setup. A voice coding component provides conversion of pulse code modulation (PCM) format voice received from a digital trunk controller (DTC) of the MSC 12 into the CDMA format frames destined for the BTS 16 using a suitable coding technique. The digital trunk controller (DTC) supports trunk terminations to the PSTN 14, furthermore, providing necessary processing and control functions between the MSC 12 and the PSTN 14. The voice coding component also converts the CDMA format frames from the BTS 16 into the PCM format voice for use in the other direction. A multiplexing component processes all the IS95 traffic frames to multiplex the voice, data and signaling information. The handoff component coordinates the communications between the subscriber unit 26 and multiple BTSs 16. The power control component of SEL 24 maintains the mobile transmit power at a desired power level. Lastly, the radio link setup component of SEL 24 is used during call setup for preparing the traffic channel on the BTS.

In further discussion of the above, the selector (SEL) includes a plurality of independent DSP units. For each mobile station, there is a single DSP unit assigned. Only one DSP is used per call originating to/from a given subscriber unit or mobile station. The unique identifier of the subscriber unit determines which DSP of the plurality of DSPs the mobile station is dedicated to.

In the instance of a mobile station traveling from a first cell to a second cell, the selector (SEL) receives one packet plus a soft handoff packet, to be further discussed below. The selector (SEL) performs some prescribed call management, including power control, selecting the best input signal packet of the one or more packets received, and sending the selected packet to the corresponding DSP (i.e., a selector card of the SEL interfaces with a corresponding DSP).

The base station transceiver subsystem (BTS) 16 provides the radio link between subscriber units (also referred to as mobile stations/mobile units) 26 and the MSC 12, wherein the BTS is located at a respective cell site. Located at the BTS or respective base station are the antennas, transmitter, receivers, power amplifiers, and interface hardware to support the link to the base station controller (BSC). Each base station provides a common air interface to the subscriber units according to the CDMA standard. For example, data from the subscriber unit 26 is converted to packets by the base station, and these packets plus additional control information are passed to the selector (SEL) 24 in the base station controller (BSC) 20 for further processing.

Each base station transceiver subsystem (BTS) thus corresponds to cell site equipment for the MSC-CDMA system and is used for performing various software functions. The BTS provides the IS95 air interface between the MSC-CDMA system and the subscriber unit. In the forward direction, the BTS accepts packets from the SEL and modulates the information on the RF carrier and transmits the packet. In the reverse direction, the BTS demodulates the RF back into packets, adds additional control information and then routes the packets via the router to the SEL for further processing. The major functions provided by the BTS software include: Over-the-air RF interface with the subscriber unit; additional over-the-air functions such as pilot, sync, paging, and access channels; call processing functions to control the subscriber unit operation over the paging and access channels, including short message services; control and management of BTS resources; and monitoring and configuration functions. BTS can either be integrated to include both digital processing and RF components, or can be distributed to allow for remote location of the RF equipment from centralized digital equipment.

Communication between a mobile station (MS) 26 and the PSTN 14 is carried out from a respective BTS or BTSs 16 to the router 22, from the router 22 to the selector (SEL) 24, from the SEL 24 to the MSC 12, and finally between the MSC 12 and the PSTN 14. Each BTS communicates with the router via a T1 (or E1) link 28. A T1 link is characterized by a communication rate of 1.54 megabits per second (Mbps) and an E1 link is characterized by a communication rate of 2 Mbps.

With the CDMA system 10, a mobile station 26 can begin a call in a first cell and subsequently travel into a second cell.

While the mobile station is in the first cell, communication will occur between the respective BTS and the router via a respective T1 link. During a transition between the first cell and the second cell, it is possible for more than one communication to occur for a given transmission, i.e., from more than one BTS and T1 link to the router. This situation occurs when a mobile station is talking to more than one BTS and in which a signal is transmitted from each BTS. In addition, the voice communication signal is a compressed voice signal, further being transmitted in the form of packets. The packets are sent through a respective T1 link from a respective BTS to the router for ultimate delivery to a dedicated DSP within the selector (SEL) 24 for the given call. Prior to reaching the corresponding DSP, the packet goes to the selector (SEL) 24, wherein the selector 24 may receive multiple packets at any given time, each packet originating from a different BTS for a given call. The selector (SEL) 24 examines all packets received to determine which of the several packets for a given call to select for further handling. At this point in the process, the selected voice packet is still compressed. A selected packet is then sent to the DSP, where the DSP decompresses the compressed voice packet or message. The decompressed (or uncompressed) voice is then sent to the MSC. The size of an uncompressed voice packet is approximately 160 bytes. When in a compressed state, voice data is compressed to a size within a range on the order of thirteen to forty-five (13–45) bytes for each packet. In comparison to sending uncompressed packets of 160 bytes in size, when compressed data is sent on a T1 link and router, more compressed data can be supported than if not compressed.

In earlier cellular telephone technology, such as time division multiple access (TDMA), as a mobile unit traveled from one cell to another, the radio link between the mobile unit and the base station serving the first cell (source cell) had to be broken then replaced by a radio link between the mobile unit and the base station serving the second cell (targer Cell). In contrast, in a code division multiple access (CDMA) cellular telephone system, because the same frequency band is used for all cells and sectors, the first link need not be broken before connecting with the second link. The CDMA waveform properties that provide processing gain are also used to discriminate between signals that occupy the same frequency band. A mobile unit thus need not switch frequencies when a call is transferred from one cell or sector to another. Additional details regarding the specifics of the CDMA cellular telephone environment are described in TIA/EIA/IS-95-A, *Mobile Station-Base Station Compatibility Standard for Dual-Mode Wideband Spread Spectrum Cellular System* (hereinafter, CDMA standard), incorporated herein by reference in its entirety.

In the context of a cellular telephone system, "handoff" is the process of handing over a call from one sector (or cell) to another when a mobile unit (also referred to as a subscriber unit or mobile station) detects that acceptable communications with the other sector are possible. This occurs mainly when the mobile unit nears a sector boundary or the current communication link is weakened by radio frequency (RF) shadowing and another potential communication path from another sector is enhanced.

The term "soft handoff" is commonly used to refer to a handoff in which the mobile unit commences communication with a new base station without interrupting communication with the old base station, i.e., the call is maintained on both base stations. If there are three cells involved in the handoff, the call will be maintained by all three base stations. A "softer handoff" refers to a handoff in which the call is maintained on one base station for different sectors of the same cell. A hybrid form of the previously discussed types of handoff, referred to as a "soft/softer handoff", results if there are two sectors from one cell and another sector from another cell involved in the handoff, in which case two base stations are involved. The terms "handoff" and "soft handoff" will hereinafter be used interchangeably to refer to all of the foregoing types of handoff.

Data that is currently available indicates that the amount of CDMA soft handoff is high. Typically, the soft handoff percentage in an MSC-CDMA system is approximately 50-to-70% of total system traffic. Despite its advantages, soft handoff still has a negative side effect due to its increased RF modems and backhaul bandwidth requirements (i.e., in order to transport the extra voice frames from base stations involved in soft handoff). For instance, with the current MSC-CDMA system, soft handoff activity requires the use of two or more packets on the T1 links to the CDMA router, one each from respective BTSs involved in the soft handoff. During soft handoff, the affected T1 links and the CDMA router voice call capacity is lessened or reduced. It would thus be desirable to alleviate the impact of these additional requirements.

In current CDMA systems, one disadvantage is that the voice call capacity of a T1/E1 line is smaller for higher percentage of soft handoff activity. If a T1/E1 line does not carry soft handoff traffic, then the T1/E1 line can support more calls on a same link. This is applicable (i.e., holds true) for fiber optic and satellite links, also.

In addition, a restriction in the CDMA architecture is that the CDMA system currently sends a voice packet or frame every 20 milliseconds. In designing any changes into the system, a variable delay (i.e., path delay) from the BTS to the selector (SEL) should not exceed 20 milliseconds, otherwise the voice communication is disrupted or out of sequence. In other words, the variation in delay between successive packets cannot exceed more than 20 milliseconds. For instance, if one packet took five milliseconds, another packet took 25 milliseconds, and a third one took only one millisecond, then what would happen is that the voice message would be received out of sequence. In such an example, the difference in delay between 25 milliseconds and one millisecond is greater than 20 milliseconds. As mentioned, the variable delay must be less than 20 milliseconds. This restriction is a result of the CDMA architecture and hardware limitation. Of the 20 milliseconds variable delay, currently some of the variable delay time is consumed by the T1 link, some consumed by the router, and some consumed by the selector (SEL), and what remains in approximately eight to nine (8–9) milliseconds. The important point is the variation of the delay. If the delay is 40 milliseconds, and the delay varies between 30 and 50 milliseconds, then it is okay. If the delay is 100 milliseconds, and it varies between 90 milliseconds to 110 milliseconds, then it is okay. What is important is that the delay (from 1 packet to the next) between packets cannot vary by more than 20 milliseconds, otherwise the CDMA system will not be able to handle the call (i.e., the call will be dropped). The CDMA system can adjust for any variations in delay of not more than 20 milliseconds.

Despite the benefit of soft handoff, current CDMA architecture satellite systems suffer from limitations such as backhaul delay. Backhaul delay is an important characteristic parameter for satellite based systems. That is, backhaul and propagation delays are a concern with respect to transmission from a BTS to a satellite to a router. Propagation delay is equivalent to the length of travel divided by the speed of the medium (speed of light for air). Backhaul delay is the sum of propagation delays plus device delay(s) (such as repeater(s)) over the link transport. For a satellite, backhaul delay is equal to the orbit length divided by the speed of light. In addition to backhaul delay, operating costs for a T-1 link are important, especially in connection with terrestrial cellular systems.

With current CDMA systems, a maximum tolerable backhaul delay is limited to approximately 8–9 milliseconds. This backhaul delay number is likely to decrease as other features are used in the CDMA systems (e.g., support for inter-system soft handoff). In addition, the transport of 8–9 milliseconds will not be enough for future technology applications. For establishing a satellite link, i.e., from a BTS to a satellite and onto the router, there is a required delay on the order of 14 milliseconds (excluding delay within the satellite itself). In such an instance of establishing a satellite link, if there is an island which would require the use of one satellite link to another satellite link, then the 8–9 milliseconds variable delay restriction would be violated, and the communication would not be possible. One reason is that the packet selection occurs subsequent to the router. If the selector has time to wake-up and it does not see any packets coming, what it will do, it will pass a silent tone (i.e., a silent interval). If no packets are received or if silent tones persist for more than a prescribed duration, then the call will be dropped.

The typical round trip (two satellite hops) delay for a satellite varies between approximately 8–14 milliseconds depending upon a particular satellite orbit, which prohibits the use of backhaul frame transport (i.e., BTS-to-BSC) over satellite links with the current MSC-CDMA product architecture. Additional delays may be encountered to transport traffic between satellite hops. For a satellite link, a signal would be transmitted from a BTS to the satellite and from the satellite to the router, instead of via a T1 link. The time required to transmit from the BTS to the satellite of a particular orbit to the router is on the order of about 14 milliseconds, which comprises a large percentage of the 20 milliseconds variable delay limitation of the CDMA architecture, further which is greater than the remaining backhaul delay of approximately 8–9 milliseconds and thus satellite communication will be dropped. In other words, if the selector (SEL) does not see a response within the 20 milliseconds variable delay, then SEL drops the call.

Thus, the current CDMA system does not support having BTSs located on multiple scattered islands (for example, countries such as Indonesia) or isolated areas (such as deserts). This is largely due to the necessity of relying on backhaul satellite transport in such circumstances.

It would thus be desirable to provide an improved mobile communications system architecture for overcoming the problems as discussed herein above.

SUMMARY OF THE INVENTION

According to one embodiment of the present disclosure, a mobile communications system having a multi-level distributed frame selection and power control architecture includes a plurality of base station transceiver subsystems (BTSs) arranged in cells. Each base station transceiver subsystem (BTS) includes a capability for establishing a radio link or radio frequency link interface with a subscriber unit in conjunction with a telephone call. A PSEL provides for implementing a power control and frame selection of compressed packet data in conjunction with the telephone call, the PSEL coupled to and being positioned proximate the plurality of base station transceiver subsystems. A router is coupled to the PSEL for routing compressed packet data to and from the PSEL. Furthermore, a CSEL provides for implementing call processing and call management in conjunction with the telephone call, the CSEL coupled between the router and a prescribed mobile switching center (MSC), and further being positioned proximate the MSC, wherein the router is further for routing compressed packet data to and from the CSEL.

In addition, according to the embodiments of the present disclosure, the multi-level distributed frame-selection and power control CDMA architecture provide for the transmission of compressed voice data over the PSTN to advantageously reduce costs, in comparison with transmitting uncompressed voice data. This takes into account that the capacity of unchannelized T1 is significantly larger than channelized T1 when variable rate packets are transmitted over a T1 link. In addition, the present embodiments enable vocoder DSP units of a CDMA system to be grouped in one location to advantageously reduce a system operating cost and network blocking.

The embodiments of the present disclosure provide advantages which include, for example, eliminating the limiting effect of backhaul delay; providing a method for reducing the cost of operating with the use of T1 lines by increasing call capacity of a T1 line and reducing a number of required T1s for use in connection with soft handoffs; facilitating the transfer of compressed data as far as possible to reduce transport costs; performing a selection of frames before transmitting over T1 links; and increasing a CDMA router voice call switching capacity.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, wherein like reference numerals are used to identify like components and in which.

DETAILED DESCRIPTION OF THE PREFERRED EMBODIMENTS

Figure 1:
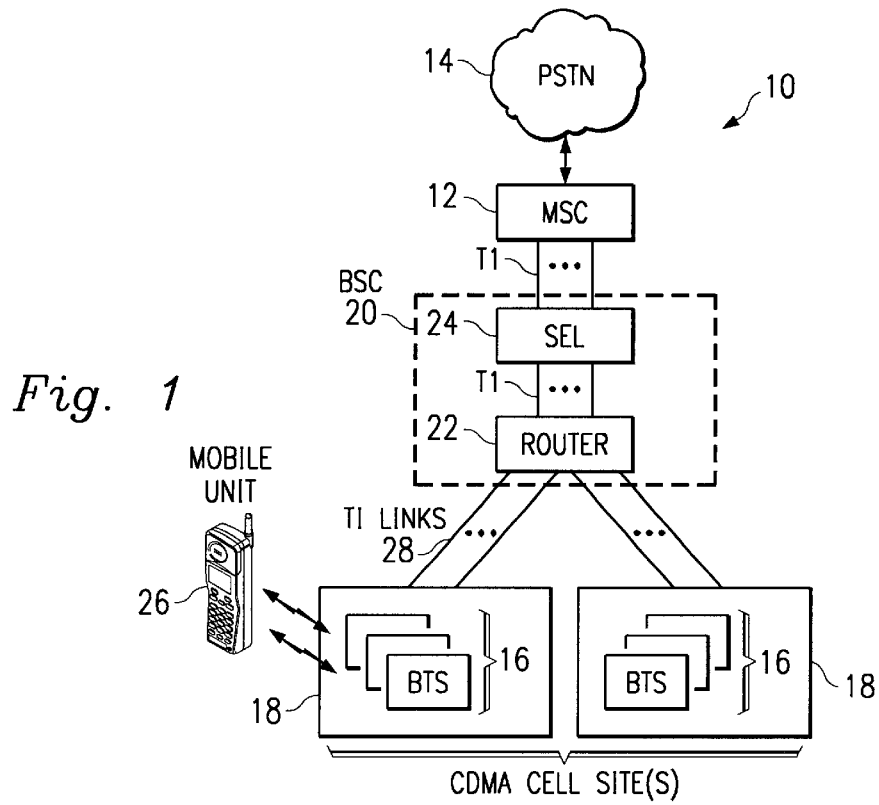
FIG. 1 illustrates a CDMA system architecture currently known in the art.
Figure 2:
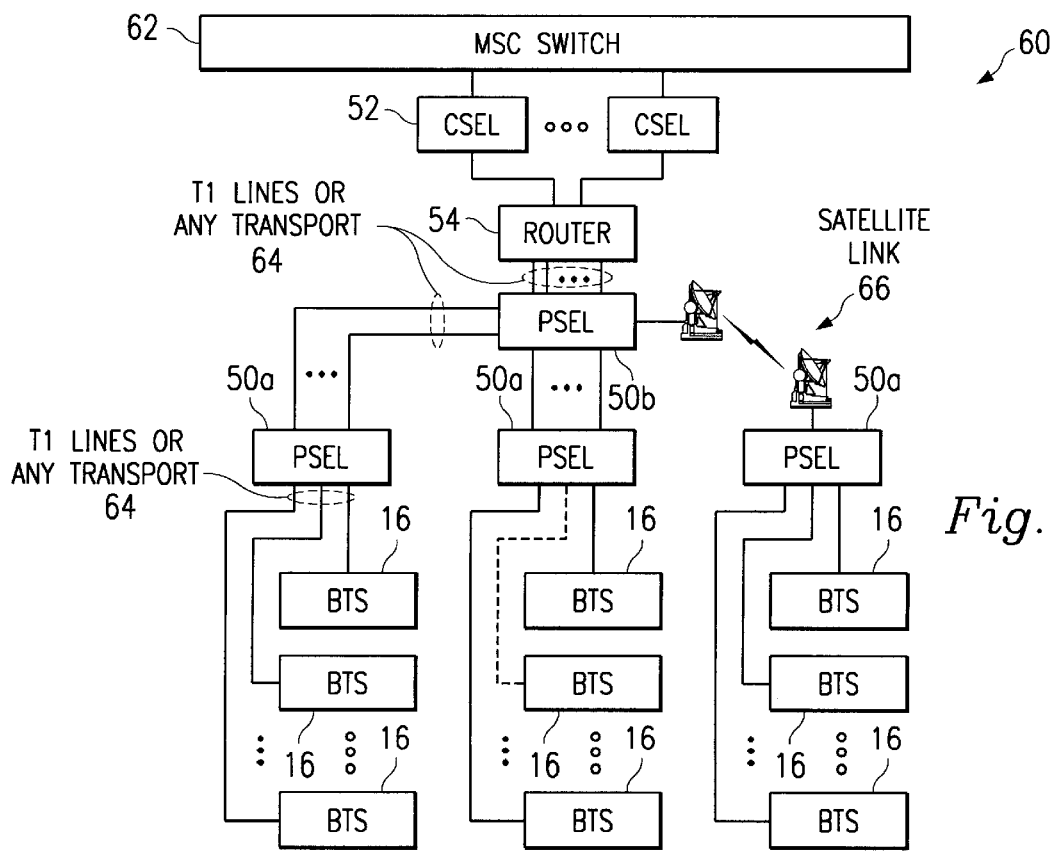
FIG. 2 illustrates one embodiment of the multi-level distributed frame selection and power control CDMA architecture, including satellite networks, according to the present disclosure.

With reference now to FIG. 2, in accordance with one embodiment of the present disclosure, a PSEL unit 50 and a CSEL unit 52 are provided for performing procedures or functionalities currently performed by a SEL (Selector) unit of a CDMA system. In accordance with the present disclosure, the functionalities of the SEL are been divided into first and second parts, respectively. In the first part, a first unit (or units) carries out the selection of frames and power control (PSEL) 50. In the second part, a second unit (or units) carries out the call processing management (CSEL) 52. In this embodiment, the PSEL unit 50 or equipment for performing the selection of frames and power control is physically placed proximate, within a prescribed close distance, to the location of a respective BTS 16. On the other hand, the CSEL unit 50 or equipment for performing call processing management is placed proximate, within a prescribed close distance, to respective DSP equipment. The DSP equipment may reside within the CSEL unit or outside a respective CSEL unit.

PSEL 50 can also be structured at multiple levels, for example, including first level PSEL units 50a and a second level PSEL unit 50b operatively coupled to the first level PSEL units 50a as shown in FIG. 2. The multiple level PSEL further includes providing a bypass for already selected frames, for example, for bypassing the second level PSEL 50b when a first level PSEL 50a has selected given compressed packets or frames for transmission via the router to the CSEL 52. That is, the architecture 60 allows the PSEL 50 to transmit the selected compressed packets (after PSEL selection) from the PSEL site to the CSEL site. This will minimize a transport bandwidth required between the PSEL 50 and CSEL 52. The PSEL 50 is not restricted to a (1) carrier type, (2) frequency band, or (3) transport type.

FIG. 2 is thus an illustration of one embodiment of a MSC-CDMA architecture 60 according to the present disclosure, the architecture 60 including a switch or MSC 62 multi-level distributed frame-selection and power control. FIG. 2 further illustrates the usage of T1 links 64 and/or satellite links 66 with the MSC-CDMA multi-level distributed frame selection and power control architecture 60 of the present disclosure.

The present embodiments further include a method of forming a multi-level distributed frame-selection and power control CDMA architecture. A first part of the method performs method selection of frames and power control using a PSEL 50. A second part performs call processing management using CSEL 52. For implementing this method, the PSEL unit 50 is placed as close as possible to a respective BTS 16; whereas a CSEL unit 52 is placed in close proximity to vocoder digital signal processor (DSP) units which are used for compression/decompression of data packets for a given phone call.

In further discussion of the above, the PSEL 50 performs frame selection, frame multicast, power control, packing and unpacking (certain type) voice and signaling traffic in one frame, soft handoff between BTSs, softer handoff between sectors within a cell, involved in hard handoff, handoff between PSEL layers (50b, 50a), bypass of selected frames, etc., mainly relating to the selection of frames and power control. The CSEL 52, on the other hand, performs call setup, call release, vocoder switching, frame sequencing, timing and synchronization managements between CSEL and vocoder (DSP), acting as a health monitor for PSEL, logging and diagnosis, packing and unpacking certain voice and signaling traffic in one frame, etc., mainly relating to call processing managements and interfacing to the DSP. Some functionality can also be interchanged between PSEL and CSEL for optimal performance and according to the particular situation.

When a call associated with a given first level (lower layer-level) PSEL 50a enters into soft handoff with a cell associated with a different first level PSEL 50a, then the frame selection and power control for the particular mobile unit phone call moves to the second level (i.e., the higher layer-level) PSEL 50b. In such an instance, the second level PSEL 50b functions for handling the soft handoff and controlling the previous two lower layer PSELs to operate in a pass-through mode. The router still receives only one packet. The lower level PSELs will not do any selection with respect to the performance of a soft handoff between two lower level PSELs. If a mobile station is talking through one PSEL and moves into an area of another PSEL, the functionality is moved from the first PSEL to the second PSEL. The second level PSEL 50b can generally operate in a pass-through mode until needed for effecting a soft handoff between two or more first level PSELs 50a.

The system architecture of FIG. 2 involves providing a group of cells coupled to a router via T1 links. There can be another group of cells coupled to the router via a satellite link 66. For each grouping of cells, there is a PSEL 50a. The PSELs are coupled to the router 54, as discussed. If on a remote island or area, the PSEL 50a is coupled via satellite link 66 to the router 54 and the CSEL 52 is proximate the MSC 62. This is made possible through the dividing out of the functionality of the selector, i.e., with power control and selection in the PSEL 50a and the call setup/release, call management, interfaces to a DSP in the CSEL 52.

A benefit of the PSEL is that one packet per sequence number of a call is sent via the T1 link between the PSEL and the router, in comparison to two or more packets required with the prior CDMA architecture, the two or more packets having been required for passing of handoff packets. With the new architecture, the router now has more available capacity to handle additional voice call packets, subscribers, via the expanded capability of the system to handle a higher volume of usage. This is a result of the power control and frame selection and the call management, setup/release being established as two separate elements, where PSEL is located proximate a prescribed group of cells and CSEL is located proximate a given MSC. Soft handoff T1 link volume usage with the prior CDMA system can now be reduced by at least fifty percent of whatever percentage of soft handoff there was, using the multi-level distributed frame selection and power control CDMA architecture of the present disclosure. The number of T1 lines required is also reduced because of the lessened packet demand going to a particular router.

Call management can be used to inform a lower level PSEL to enter a pass through mode during a soft handoff by a higher level PSEL. If there is a handoff between first and second cells, where a first BTS knows that the BTS is seeing a pilot or a sector and it needs to handoff, what the BTS can do is that the corresponding PSEL can inform the higher level PSEL in the following manner. The lower level PSEL can inform the higher level PSEL that there is a problem here, the lower level PSEL is not reaching the BTS of the neighboring cell. The higher level PSEL responds with an indication that it can handle the problem and for the lower level PSEL to pass the packet information onto the higher level PSEL. The higher level PSEL thus takes over control for the lower level PSEL.

A situation may arise that a mobile station can be communicating with several BTSs at any one time period of time, for example, when the mobile station is in a region proximate a boundary area of several cells. In one instance, the mobile station may be communicating with several BTSs within a region controlled by a particular PSEL. In another possibility, the BTSs are between adjacent regions controlled by different PSELs, wherein control goes to a higher level PSEL for handling soft handoffs between two neighboring lower level PSELs.

Figure 3:
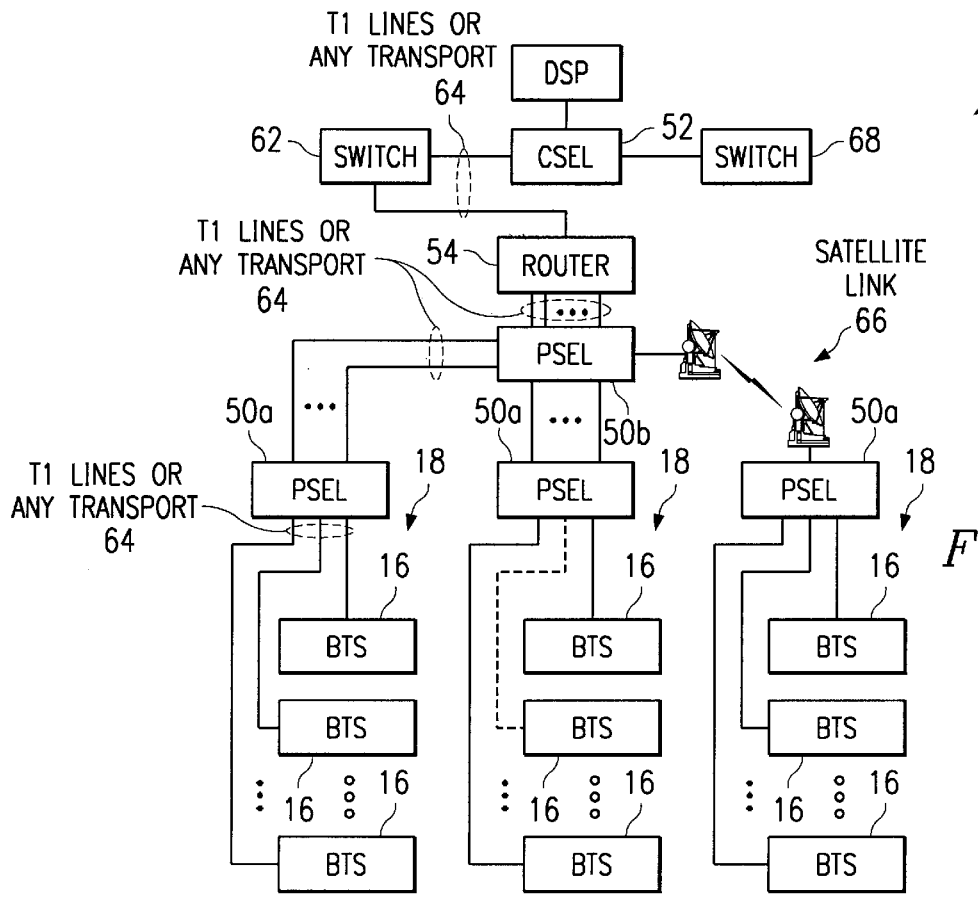
FIG. 3 illustrates another embodiment of the multi-level distributed frame selection and power control CDMA architecture, including satellite networks, according to the present disclosure.

Referring now to FIG. 3, in accordance with another embodiment of the present disclosure, compressed packets are transmitted (after PSEL selection) from one MSC site to another (alternatively one switch 62 to another 68) over an unchannelized T1. This maximizes a capacity of the system T1 links 64 and reduces their required number.

Further in connection with FIG. 3, the coupling between the router and a destination CSEL can include any type of available public network, e.g., fiber or Internet Protocol (IP) networks or any network that provides service at the destination or target. During delivery over the Public network, the voice packet data in accordance with the embodiments of the present disclosure is in a compressed state. The public network is thus used for transmission of compressed data packets. At the destination or target, a CSEL will handle call management and interfacing to a DSP.

As a result of implementation of the present embodiments, T1 operation costs are estimated to decrease or be reduced on the order of twenty-five percent (25%). This estimate is further based upon the assumption that a two stage selection is used and that the distance of T1 links between stages are equal.

The present embodiments still further provide for increased main router 54 capacity. For example, in a prior system having 36 SELs and 132 BTSs per router (40% traffic with calls having 2-way soft handoff and 30% traffic with calls having 3-way soft handoff, i.e., an aggregate of two links per call requirement), the expected number of BTSs when using the present embodiments can be increased to 200 BTSs per router. The new and enhanced PSEL and CSEL units can be used without a limitation on the number of links connecting the router and the PSEL and CSEL units. The system can be re-provisioned as follows (assuming that the port limitation of the router is taken care of by the multi-level PSEL): 50 enhanced-CSEL cards; and 200 BTSs.

With respect to delaying compression as illustrated in FIG. 3, since selection is done at an early stage (i.e., by PSEL 50a proximate the BTS 16), the voice compression/decompression can be delayed to a later stage without limitation of backhaul delay (i.e., by CSEL 52 proximate a DSP). This provides additional flexibility on software and hardware design since the constraint of delay is softened in accordance with use of the present embodiments. The CSEL regulates the sequencing and timing in the delivery of CDMA frames from the PSEL to the DSP.

In regard to satellite-based networks, the functionality transfer between two satellite areas can now be handled in a manner similar to the one discussed herein above with respect to terrestrial T1-based CDMA networks. A multi-level satellite PSEL can be used to manage soft handoff calls and functionalities between multiple coverage areas. It is re-emphasized that with current BSC-centered management of power control and soft handoff frame selection, it is not possible to support very remote BTSs via satellite-based backhaul transport, i.e., due to excessive delays causing diversity frames to arrive at the BSC beyond the 20 millisecond time-frame required for soft handoff selection. This problem is eliminated with the implementation of the present embodiments, i.e., the new architecture, since frame selection/combining and power control take place earlier on in the communication process via a PSEL 50 (i.e., as close to the BTSs as possible), and once this is done, there is no hard limit (e.g., 20 milliseconds) on the backhaul transport delay, except as may be customary in general telephone networks.

As mentioned above, PSEL performs power control and frame selection. Power control is for the maintaining of the mobile unit transmit power at a desired level. PSEL works in conjunction with the BTS to control the power. The PSEL-to-BTS link is referred to as a forward link, whereas the BTS-to-PSEL is referred to as a reverse link. Frame selection of PSEL relates to the performing of a soft handoff. The functions of power control and frame selection are known in the art, for example, as discussed in the CDMA system standard.

Further as discussed above, PSEL is placed as close as possible to a BTS or group of BTSs. The distance between a BTS and the PSEL is relatively short in comparison to the distance between the BTS and the CSEL. The BTS communicates with the PSEL, the PSEL then communicates with the router via a T1 link (or other suitable link). The router communicates with the CSEL, the CSEL communicates with the DSP, and lastly, the DSP communicates with the MSC.

When a selection is done between packets by PSEL, only one packet is thereafter sent from PSEL to the router, then on to CSEL, furthermore, without any additional soft handoff packet being transmitted beyond the PSEL. In contrast, under the prior CDMA system, two T1 links were required for transmitting respective packets from one or more BTSs to the router, then to the selector. In the latter instance, T1 link call capacity was undesirable consumed. With the present embodiments, only one packet is required to be transmitted to the router, since PSEL makes the selection between BTSs, as induced by a given mobile station (MS).

The present embodiments further provide for eliminating the hard limit due to backhaul transport delay. In addition, after a selection by PSEL, there is no longer the 20 milliseconds variable delay limitation as was required in the prior CDMA system. As a result, a satellite link can be advantageously placed between a PSEL and the router. In other words, as a result of the selection being carried out prior to the signal or packet transmission to the router, it is no longer necessary to be as concerned with all components together meeting the 20 milliseconds variable delay limitation of the prior CDMA system. In the past, some of the 20 milliseconds has been consumed, for example, by the T1 link, router, and SEL, which consumed approximately 11 milliseconds. In such an instance, what remained of the 20 milliseconds was 9 milliseconds (20−11=9), i.e., the remainder of a variable delay.

Figure 4:
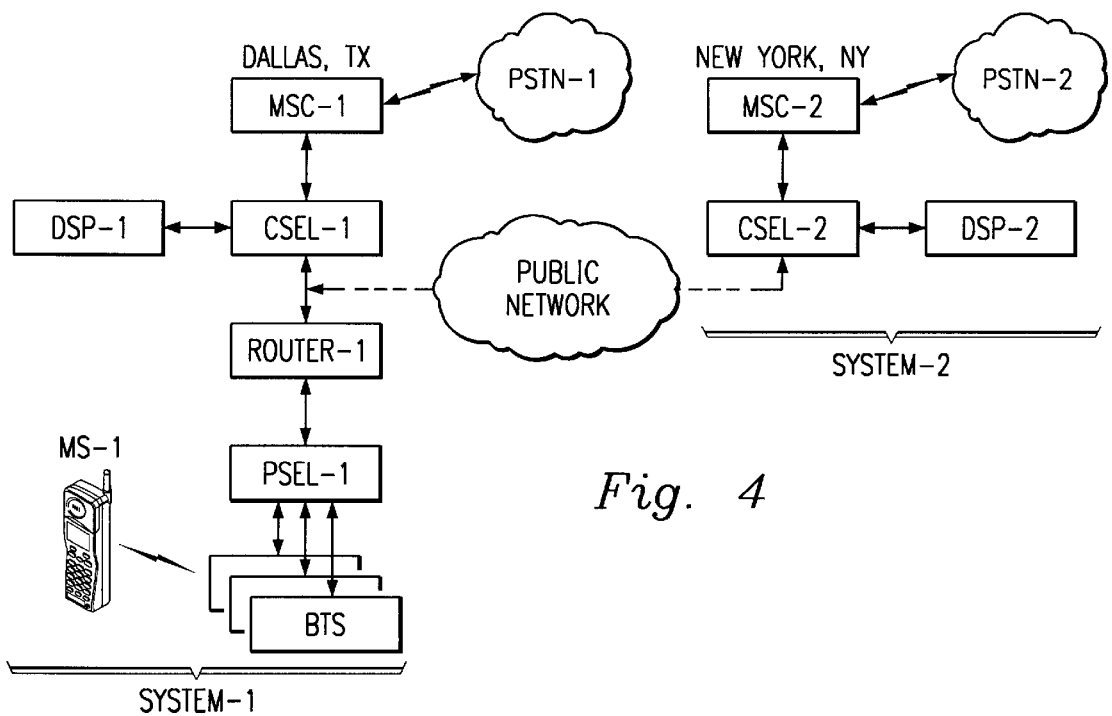
FIG. 4 illustrates an embodiment of the multi-level distributed frame selection and power control CDMA architecture, including use of a public network for transmission of uncompressed packet data to a CSEL and DSP of a destination or target MSC.

Referring now to FIG. 4, for example, if a phone call were being carried out using the system of the present disclosure to a person in New York, N.Y., from Dallas, Tex., then instead of changing the compressed packets to uncompressed packets in Dallas, Tex., on System-1 the packets would be changed from compressed to uncompressed packets at the destination, i.e., by a DSP in NewYork, N.Y. on System-2. The present embodiments allow the CDMA system or other system to make use of the concept of placing the MSC closer to the destination (e.g., placing the DSP as close as possible to New York, N.Y. in this example).

With the present embodiments, a control message is provided to the PSEL when the destination CSEL is somewhere other than the CSEL belonging to the local MSC-CDMA system. The control message includes, for example, the necessary routing information necessary to route the compressed voice data packets to the destination CSEL and DSP. After DSP, the packet data is decompressed. With the present embodiments, it is not required to have the destination CSEL positioned locally to the PSEL, but can be remote to whatever the destination may be. Voice packet data stays compressed until after digital signal processing at the destination.

In the example above, further with reference to FIG. 4, the router (Router-1) sends compressed data packets to a remote CSEL (CSEL-2) in New York, N.Y. The local CSEL (CSEL-1) would be involved in the call setup, however, may not be required further once the call setup is established between the origination and the destination. The links used for the communication could include fiber optic, T1 link, etc., as established by the router (Router-1). A DSP (DSP-2) in the locality of the destination will be used for performing compression/decomposition of data packets. Subsequent to the call being setup, the call will be routed from the origination PSEL (PSEL-1) to a CSEL (CSEL-2) in a proximity to the destination. The router utilizes routing information of the data packets to determine where to route the call.

During call setup, a dialing phone communicates a phone number with a MSC. The MSC has a home location register (HLR), the HLR for performing a search to determine where is the person being called. Based on the HLR determination, there will be some routing, from a first switch to a second switch. The router can have an output to the PSTN, as well as to a CSEL of a given MSC.

Figure 5:
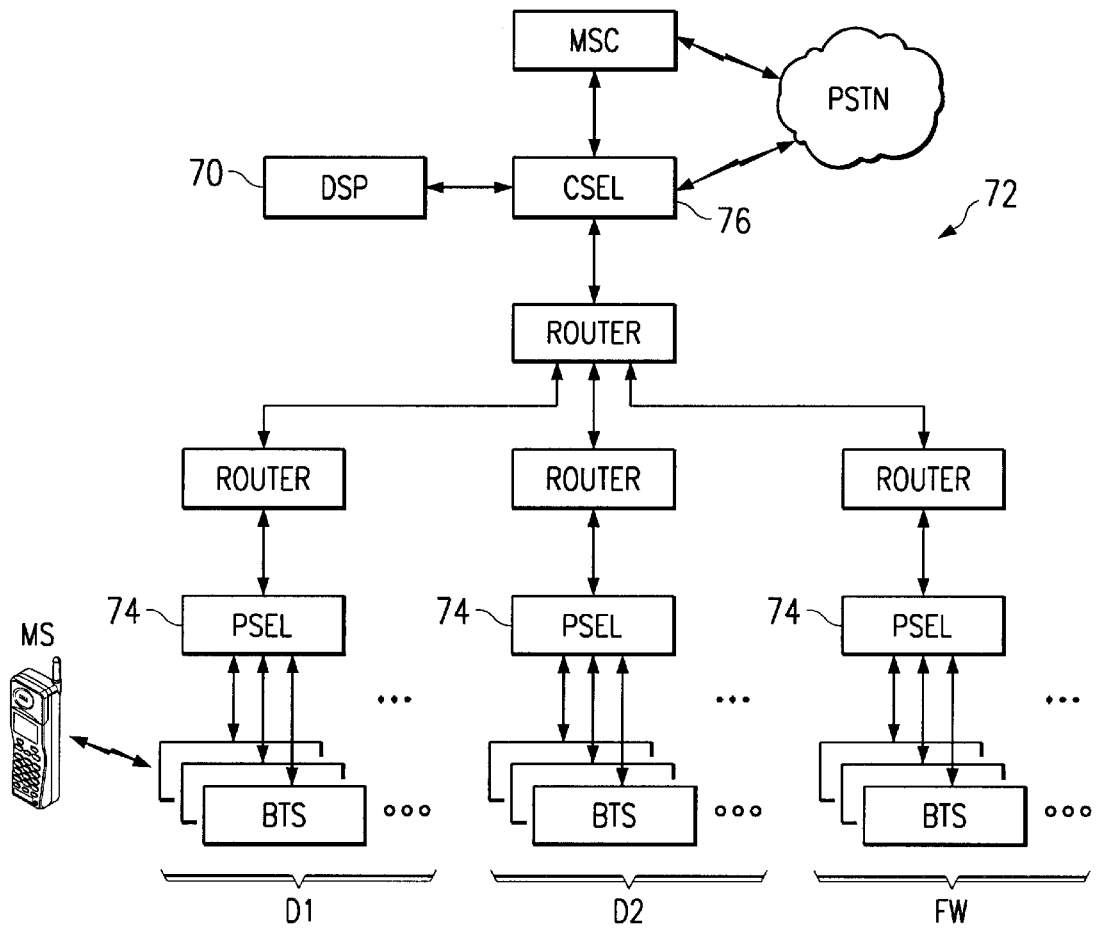
FIG. 5 illustrates an embodiment of the multi-level distributed frame selection and power control CDMA architecture utilizing DSP pooling and incorporating several MSCs within a single MSC.

With reference now to FIG. 5, caller usage volume in any particular geographic area can vary over time. The present embodiments enable the use of a DSP pool 70, in which capacity can be shared over a larger coverage area, i.e. between systems D1, D2, and FW, thereby saving on a total number of required DSPs. With the present embodiments, once the call processing has been delayed to a later stage, in particular, the decompression, a pool of DSPs 70 can be assembled from all places within a given MSC system 72 and, furthermore, in locations remote from a given PSEL 74. Separation of frame selection and call management, with the use of PSEL 74 and CSEL 76, facilitates the pooling of DSPs.

To illustrate further, assume for a moment, a major metropolitan area is serviced by three MSCs, each MSC having 3,000 DSPs. One MSC may be operating at full capacity in the morning, while another may be under utilized. In addition, another MSC may be utilized to its maximum capacity in the evening, whereas it was under utilized in the morning. In such an instance, the prior network architecture prevents a maximum efficiency of DSP usage to be carried out. The present embodiment, however, enables the DSPs to be positioned at respective locations proximate a corresponding MSC.

The present embodiments thus advantageously facilitate DSP pooling for a CDMA system. In the prior CDMA system, the DSP was previously required to be in close proximity to the selector, as a function of, and in accordance with, the 20 milliseconds variable delay limitation. With the present embodiments, the DSPs are MSC independent, and thus a single MSC will now be able to support multiple currently known MSCs. The present embodiments also enable CDMA to receive the benefit of other known techniques.

The following listing summarizes various aspects of the present embodiments. It is estimated that the transport links operating cost can drop by an order of 25%. An amount of traffic or number of BTSs supported can be increased by a factor close to the amount of soft handoff traffic for a particular CDMA router. The new architecture eliminates or softens the CDMA hard limit for backhaul transport delay. The multi-level distributed frame selection and power control CDMA architecture 60 can thus advantageously support satellite-based networks, remote-based networks, and land-based networks on the same "super" MSC switch. The present embodiments furthermore facilitate the use of CDMA in a distributed architecture where voice compression is moved as far as possible away from the selection and power control of PSEL 50, close to the destination and corresponding CSEL 52 and DSP proximate the destination.

The present embodiments still further facilitate the use of CDMA with pooling of DSP resources for a large area. The present embodiments also reduce software and hardware design limits. The new architecture of PSELs furthermore provides for a continuous coverage of soft handoff, in comparison with hard handoff, wherein the handoffs are accomplished by means of handoff between PSELs. The CDMA system may thus also include a BTS positioned within a remote cell wherein the remote BTS communicates with the router via a satellite and appropriate satellite links.

While the invention has been particularly shown and described with reference to the preferred embodiment thereof, it will be understood by those skilled in the art that various changes in form and detail maybe made therein without departing form the spirit and scope of the invention, as set forth in the following claims.

What is claimed is:

1. A mobile telephone communications system having a multi-level distributed architecture, said system comprising:

a plurality of base station transceiver subsystems (BTSs) arranged across a plurality of cells, each base station transceiver subsystem (BTS) operable for establishing a radio frequency interface with a subscriber unit in conjunction with a telephone call;

at least one first level PSEL unit coupled to a prescribed plurality of base station transceiver subsystems, said at lease one first level PSEL unit for implementing a first level power control and frame selection of compressed packet data in conjunction with the telephone call, each said first level PSEL unit being positioned proximate a respective prescribed plurality of base station transceiver subsystems;

second level PSEL unit coupled to said at least one first level PSEL unit, said second level PSEL unit for implementing a second level power control and frame selection of compressed packet data in conjunction with the telephone call;

router coupled to said second level PSEL unit, said second level PSEL being coupled between said at least one first level PSEL unit and said router on a BTS-side of said router, said router for routing compressed packet data in conjunction with the telephone call from said at least one first level PSEL unit through said second level PSEL unit and to said at least one first level PSEL unit through said second level PSEL unit; and at least one CSEL unit coupled between said router and a prescribed mobile switching center (MSC) on an MSC-side of said router, said at least one CSEL unit separate from said at least one first level PSEL and said second level PSEL for implementing call processing and call management in conjunction with the telephone call, said at least one CSEL unit further being positioned proximate the MSC, said router further for routing compressed packet data between said second level PSEL unit on the BTS-side of said router and said at least one CSEL unit on the MSC-side of said router.

2. The system of claim 1, wherein said at least one first level PSEL unit includes a plurality of first level PSELs for implementing a first level power control and frame selection, the plurality of first level PSELs being coupled to and positioned proximate a respective prescribed plurality of base station transceiver subsystems, further wherein said second level PSEL unit operates in either of two modes, i) a first mode including a pass-through mode wherein frame selection is performed by a first level PSEL and ii) a second mode, wherein a particular movement of the subscriber unit gives rise to the occurrence of a soft handoff between BTSs of different first level PSELs and said second level PSEL operates to handle the soft handoff while placing respective first level PSELs in a pass-through mode.

3. The system of claim 1, further wherein said router is coupled to said CSEL via at least one of the following selected from the group consisting of T1 link, E1 link, satellite link, fiber optic link, a public network, a router, and a mobile switching center.

4. The system of claim 1, wherein said CSEL is coupled to the MSC via a plurality of digital signal processors (DSPs), wherein a prescribed selected frame, as selected by one of said at least one first level PSEL and said second level PSEL, includes compressed packet data and is transmitted from a respective PSEL, via said router, and to said CSEL, further wherein a prescribed digital signal processor DSP of the plurality of DSPs decompresses the packet data of the selected frame.

5. The system of claim 1, wherein said second level PSEL is coupled to said router via a T1 link.

6. The system of claim 1, wherein said second level PSEL is coupled to said router via an E1 link.

7. The system of claim 1, wherein said second level PSEL is coupled to said router via a satellite link.

8. The system of claim 1, wherein said second level PSEL is coupled to said router via a fiber optic link.

9. A mobile communications system having a multi-level distributed architecture, said system comprising:

a plurality of base station transceiver subsystems (BTSs) arranged in cells, each base station transceiver subsystem (BTS) operable for establishing a radio frequency interface with a subscriber unit in conjunction with a telephone call;

PSEL means coupled to and being positioned proximate said plurality of base station transceiver subsystems, said PSEL means for implementing a power control and frame selection of compressed packet data in conjunction with the telephone call;

router coupled to said PSEL means on a BTS-side of said router, said router for routing compressed packet data to and from said PSEL means; and CSEL means coupled between said router and a prescribed mobile switching center (MSC) on an MSC-side of said router and further being positioned proximate the MSC, said CSEL means being separate from said PSEL means, said router further for routing compressed packet data between said PSEL means on the BTS-side of said router and said CSEL means on the MSC-side of said router.

10. The system of claim 9, wherein said PSEL includes at least one first level PSEL for implementing a first level power control and frame selection, the at least one first level PSEL being coupled to and positioned proximate a respective prescribed plurality of base station transceiver subsystems, said system further comprising:

second level PSEL means for implementing a second level power control and frame selection in conjunction with the telephone call, said second level PSEL coupled to and positioned proximate the at least one first level PSEL, wherein upon a particular movement of the subscriber unit giving rise to the occurrence of a soft handoff between BTSs of different first level PSELs, said second level PSEL is configured to handle the soft handoff and places the respective first level PSELs in a pass-through mode, further wherein said router routes compressed packet data to and from the at least one first level PSEL through said second level PSEL.

11. The system of claim 9, wherein said PSEL is coupled to said router via a T1 link.

12. The system of claim 9, wherein said PSEL is coupled to said router via an E1 link.

13. The system of claim 9, wherein said PSEL is coupled to said router via a satellite link.

14. The system of claim 9, wherein said PSEL is coupled to said router via a fiber optic link.

15. The system of claim 9, further wherein said router is coupled to said CSEL via at least one of the following selected from the group consisting of T1 line, E1 line, satellite link, fiber optic link, a public network, router, and switch.

16. The system of claim 9, wherein said CSEL is coupled to the MSC via a plurality of digital signal processors (DSPs), wherein a prescribed selected frame as selected by said PSEL includes compressed packet data and is transmitted from said PSEL, via said router, and to said CSEL, further wherein a prescribed digital signal processor DSP of the plurality of DSPs decompresses the packet data of the selected frame.

17. A method for establishing a multi-level distributed architecture for a mobile telephone communications system, said method comprising the steps of:

providing a plurality of base station transceiver subsystems (BTSs) arranged across a plurality of cells, each base station transceiver subsystem (BTS) operable for establishing a radio frequency interface with a subscriber unit in conjunction with a telephone call;

implementing a first level power control and frame selection of compressed packet data in conjunction with the telephone call with the use of at least one first level PSEL unit, each first level PSEL unit being coupled to and positioned proximate a respective prescribed plurality of base station transceiver subsystems;

implementing a second level power control and frame selection of compressed packet data in conjunction with the telephone call with the use of a second level PSEL unit, the second level PSEL unit coupled to the at least one first level PSEL unit;

routing compressed packet data in conjunction with the telephone call from the at least one first level PSEL unit through the second level PSEL unit and to the at least one PSEL unit through the second level PSEL unit with the use of a router coupled to the second level PSEL unit on a BTS-side of the router; and implementing call processing and call management in conjunction with the telephone call with the use of at least one CSEL unit, the at least one CSEL unit being separate from the at least one first level PSEL unit and the second level PSEL unit, the at least one CSEL unit coupled between the router and a prescribed mobile switching center (MSC) on an MSC-side of the router, the at least one CSEL unit further being positioned proximate the MSC, wherein the router is further for routing compressed packet data between the second level PSEL unit on the BTS-side of the router and the at least one CSEL unit on the MSC-side of the router.

18. The method of claim 17, wherein the at least one first level PSEL includes a plurality of first level PSELs for implementing a first level power control and frame selection, the plurality of first level PSELs being coupled to and positioned proximate a respective prescribed plurality of base station transceiver subsystems, further wherein the second level PSEL operates in either of two modes, i) a first mode including a pass-through mode wherein frame selection is performed by a first level PSEL and ii) a second mode, wherein a particular movement of the subscriber unit gives rise to the occurrence of a soft handoff between BTSs of different first level PSELs and the second level PSEL is configured to handle the soft handoff while placing respective first level PSELs in a pass-through mode.

19. The method of claim 17, further wherein the router is coupled to the CSEL via at least one of the following selected from the group consisting of T1 link, E1 link, satellite link, fiber optic link, a public network, a router, and a mobile switching center.

20. The method of claim 17, wherein the CSEL is coupled to the MSC via a plurality of digital signal processors (DSPs), wherein a prescribed selected frame, as selected by one of the at least one first level PSEL and the second level PSEL, includes compressed packet data and is transmitted from a respective PSEL, via the router, and to the CSEL, further wherein a prescribed digital signal processor DSP of the plurality of DSPs decompresses the packet data of the selected frame.

21. The method of claim 17, wherein the second level PSEL is coupled to the router via one of the following selected from the group consisting of a T1 link, E1 link, satellite link, and optic fiber link.

22. A method of implementing a multi-level distributed architecture in a mobile communications system, said method comprising the steps of:

providing a plurality of base station transceiver subsystems (BTSs) arranged in cells, each base station transceiver subsystem (BTS) operable for establishing a radio frequency interface with a subscriber unit in conjunction with a telephone call;

implementing a power control and frame selection of compressed packet data in conjunction with the telephone call with the use of a PSEL unit, the PSEL unit coupled to and being positioned proximate the plurality of base station transceiver subsystems;

routing compressed packet data to and from the PSEL unit with the use of a router coupled to the PSEL unit on a BTS-side of the router; and implementing call processing and call management in conjunction with the telephone call with the use of a CSEL unit, the CSEL unit coupled between the router and a prescribed mobile switching center (MSC) on an MSC-side of the router and further being positioned proximate the MSC, the CSEL unit being separate from the PSEL unit, the router further for routing compressed packet data between the PSEL unit on the BTS-side of the router and the CSEL unit on the MSC-side of the router.

23. The method of claim 22, wherein the PSEL unit includes at least one first level PSEL for implementing a first level power control and frame selection, the at least one first level PSEL being coupled to and positioned proximate a respective prescribed plurality of base station transceiver subsystems, said method further comprising the step of:

implementing a second level power control and frame selection in conjunction with the telephone call with the use of a second level PSEL, the second level PSEL coupled to and positioned proximate the at least one first level PSEL, wherein upon a particular movement of the subscriber unit giving rise to the occurrence of a soft handoff between BTSs of different first level PSELs, the second level PSEL operates to handle the soft handoff and places the respective first level PSELs in a pass-through mode, further wherein the router routes compressed packet data to and from the at least one first level PSEL through the second level PSEL.

24. The method of claim 22, wherein the second level PSEL is coupled to the router via one of the following selected from the group consisting of a T1 link, E1 link, satellite link, and optic fiber link.

25. The method of claim 22, further wherein the router is coupled to the CSEL via at least one of the following selected from the group consisting of T1 line, E1 line, satellite link, fiber optic link, a public network, router, and switch.

26. The method of claim 22, wherein the CSEL is coupled to the MSC via a plurality of digital signal processors (DSPs), wherein a prescribed selected frame as selected by the PSEL includes compressed packet data and is transmitted from the PSEL, via the router, and to the CSEL, further wherein a prescribed digital signal processor DSP of the plurality of DSPs decompresses the packet data of the selected frame.

* * * * *